(12) United States Patent
Thorenz

(10) Patent No.: US 6,547,686 B1
(45) Date of Patent: Apr. 15, 2003

(54) CONTINUOUSLY VARIABLE AUTOMATIC TRANSMISSION

(75) Inventor: Frank Thorenz, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/914,627

(22) PCT Filed: Feb. 24, 2000

(86) PCT No.: PCT/EP00/01506
§ 371 (c)(1),
(2), (4) Date: Aug. 30, 2001

(87) PCT Pub. No.: WO00/52362
PCT Pub. Date: Sep. 8, 2000

(30) Foreign Application Priority Data

Mar. 1, 1999 (DE) .......................................... 199 08 840

(51) Int. Cl.$^7$ .......................... F16H 57/04; F01M 1/00; F01M 9/06; F16D 55/02; F16D 13/60

(52) U.S. Cl. ............... 475/159; 192/113.34; 192/70.12; 184/11.3; 188/71.6

(58) Field of Search ....................... 475/159; 192/113.3, 192/113.5, 113.34, 113.35, 70.12; 184/11.1, 11.3, 13.1; 188/71.6, 264 D, 264 F

(56) References Cited

U.S. PATENT DOCUMENTS

| | | | | |
|---|---|---|---|---|
| 3,552,534 A | * | 1/1971 | Kern ..................... | 192/113.34 |
| 4,450,944 A | * | 5/1984 | Fujioka et al. ......... | 192/113.34 |
| 4,526,054 A | * | 7/1985 | Ehrlinger .................... | 184/6.12 |
| 4,540,077 A | * | 9/1985 | Yamamoto et al. ..... | 192/113.34 |
| 4,817,774 A | * | 4/1989 | Digele .................... | 192/58.681 |
| 5,706,694 A | | 1/1998 | Bhookmohan et al. ....... | 72/325 |
| 6,059,682 A | | 5/2000 | Friedmann et al. ......... | 475/159 |
| 6,206,163 B1 | * | 3/2001 | Schneider ................ | 192/113.3 |

FOREIGN PATENT DOCUMENTS

| | | | | |
|---|---|---|---|---|
| DE | 31 49 880 A1 | | 7/1982 | ......... F16D/25/063 |
| DE | 31 49 880 C2 | | 7/1985 | ......... F16D/25/063 |
| DE | 41 36 040 C1 | | 1/1993 | ........... F16H/57/04 |
| DE | 19501799 | * | 7/1996 | ........... F16H/57/04 |
| DE | 198 00 490 A1 | | 8/1998 | ........... F16D/13/72 |
| EP | 0 434 525 B1 | | 12/1990 | ............. F16H/3/66 |

* cited by examiner

Primary Examiner—Sherry Estremsky
Assistant Examiner—Tisha D. Lewis
(74) Attorney, Agent, or Firm—Davis & Bujold, P.L.L.C.

(57) ABSTRACT

The continuously variable automatic transmission has a plurality of clutches and brakes wherein at least a part of the clutches is designed as wet multi-disk clutches having an inner and an outer disk carrier and wherein the inner disk carrier generally rotates and the outer disk carrier remains fixed. The clutch in which, in the operating state of stationary disengagement, the inner disk carrier remains fixed and the outer disk carrier rotates is provided with a splash-lubrication pot (5), which is situated within the inner disk carrier coaxially to the hollow shaft and which is firmly connected with a constantly rotating part (7) of the clutch, the outer wall of the splash-lubrication pot being provided with holes (6).

8 Claims, 2 Drawing Sheets

CONTINUOUSLY VARIABLE AUTOMATIC TRANSMISSION

FIELD OF THE INVENTION

This invention relates to a continuously variable transmission for a motor vehicle having a plurality of clutches and brakes designed as wet disk sets.

BACKGROUND OF THE INVENTION

Continuously variable transmissions for motor vehicles are widely known. EP B 434 525 thus describes an automatic transmission for motor vehicles which has planetary gear sets shifted by means of clutches and brakes and connected with a hydraulic torque converter provided with a lock-up clutch. This automatic transmission has one input shaft and one output shaft with a double planetary gear set, at least one power path between the input shaft and the double planetary gear set, the same as three clutches and two brakes the selective engagement of which arranged in pairs determines different reduction ratios between the input shaft and the output shaft. Six forward gears and one reverse gear can be obtained by the three clutches and two brakes.

In a multiplicity of continuously variable transmissions at least the clutches are designed as wet multi-disk clutches cooled by an oil flow. The oil is mostly passed from inside to outside by the disk set, the inner disk carrier rotating during the operation in order to press the oil in radial direction through the disk set. If this is not the case, the disk set is no longer cooled over the whole lining surface.

In many transmissions there is an operating state, namely, the "stationary disengagement", in which the outer disk carrier rotates with its disk set while the inner disk carrier remains fixed with its disk set. The cold oil centrally supplied, via the hollow shaft, therefore, is not splashed from the inside to the outside through the disk set so that an insufficient cooling results.

The problem on which this invention is based is to configure a continuously variable transmission with wet multi-disk clutches so that even in the operating state of stationary disengagement with fixed inner disk carrier and rotating outer disk carrier the disk set is sufficiently cooled.

SUMMARY OF THE INVENTION

It is proposed, according to the invention, that with the clutch having in the operating state of stationary disengagement the fixed inner disk carrier and the rotating outer disk carrier, a splash-lubrication pot is associated which is situated in the space surrounded by the inner disk carrier coaxially to the hollow shaft through which the cold oil of the clutch is fed and that the splash-lubrication pot is connected with a continuously rotating part of the clutch. The outer wall of the splash-lubrication pot is provided with holes which allow a radial exit of the oil absorbed in direction of the disk set. The rotating part which is lubricated by the splash-lubrication pot is located conveniently to the appertaining clutch baffle plate.

The cold oil exiting through the hollow shaft is, therefore, absorbed with the splash-lubrication pot, the collected oil being formed by rotation into a rotating oil column whereby a rotation pressure forms on the inner side of the outer wall of the splash-lubrication pot by the holes provided in the outer wall of the splash-lubrication pot, the oil is the sprayed from the inside against the disk set so that the latter can now be effectively cooler.

BRIEF DESCRIPTION OF THE DRAWINGS

The invention is explained in detail below with reference to the drawings in which an advantageous embodiment is shown. In the drawings.

DETAILED DESCRIPTION OF THE INVENTION

Figure 1:
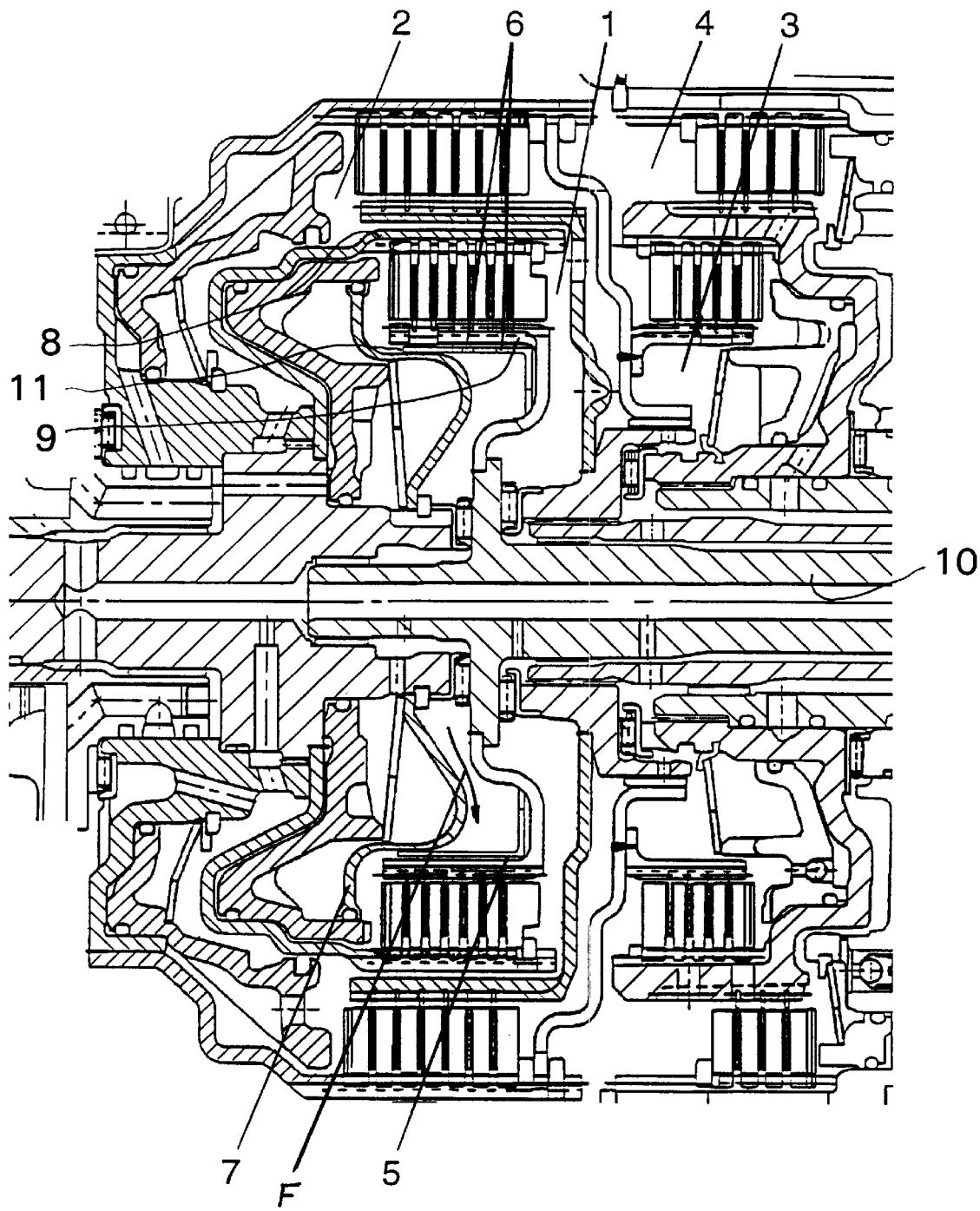
FIG. 1 is a partial section through a continuously variable transmission with the inventive splash-lubrication pot.

Since the expert is familiar with continuously variable automatic transmissions, only the parts essential for understanding the invention have been provided with reference numerals on FIG. 1. This part section shows that in the continuously variable transmission several wet multi-disk clutches or brakes are provided which are marked with the numerals 1 to 4, respectively. Clutch 1 is in an operating state of stationary disengagement, the case in which the outer disk carrier 8 belonging to the clutch A rotates with its disk set while the inner disk carrier 9 of clutch A remains stationary with its disk set. The cold oil originating from the hollow shaft 10 of the transmission and fed to clutch A, in the direction of arrow f, no longer cools in this operating condition the disk set over its whole lining surface.

Figures 2A, 2B:
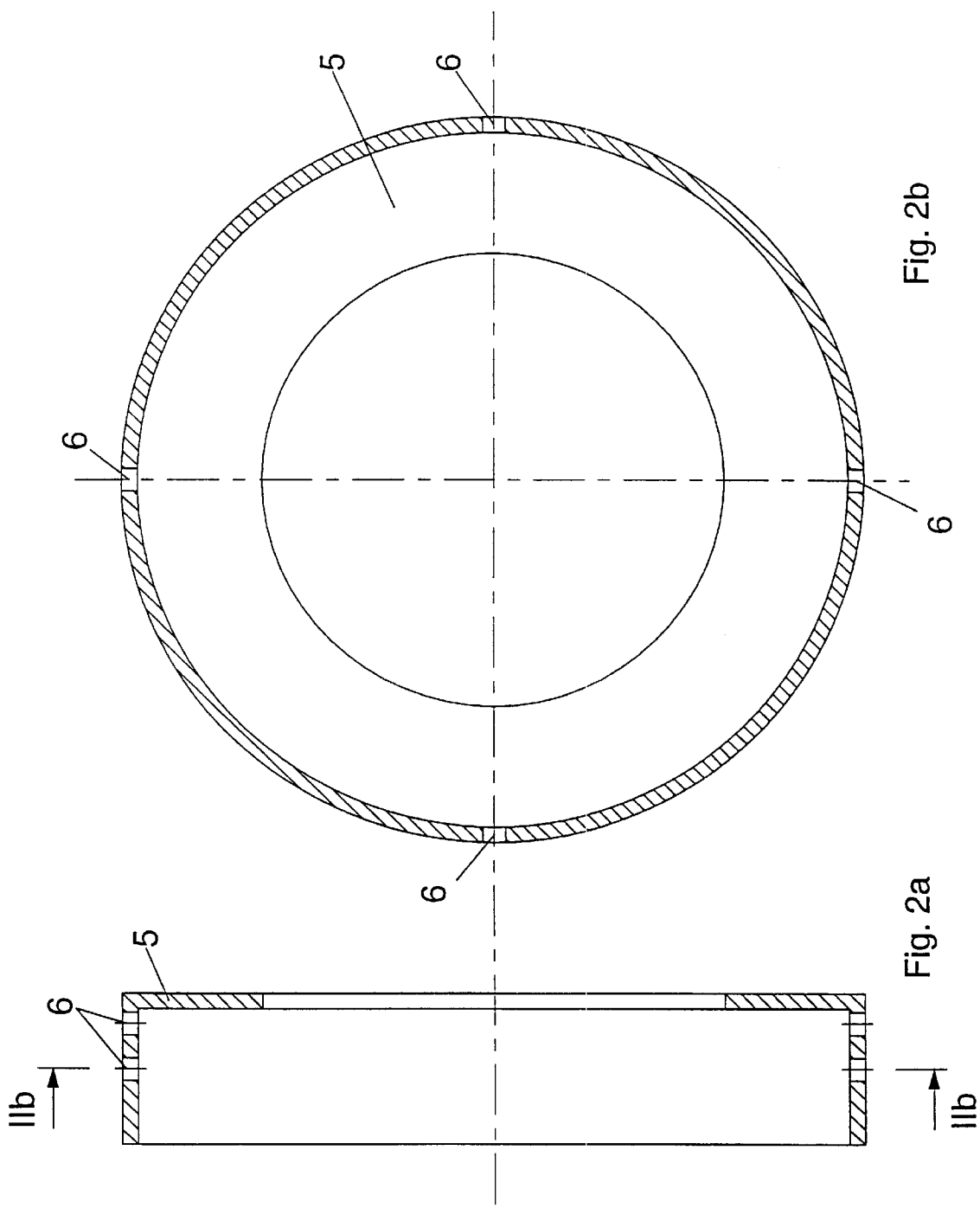
FIGS. 2a and 2b show a section or a topview of the splash-lubrication pot.

According to the invention, associated with the clutch A is now a splash-lubrication pot 5 which is situated in the space surrounded by the inner disk carrier 9, which is firmly connected with a continuously rotating part, the appertaining clutch baffle plate 7 in this case, and which absorbs the cold oil entering in direction of arrow f. In order that the disk set be now cooler, the cylindrical outer wall 11 of the splash-lubrication pot 5 is provided with a multiplicity of holes 6 (FIGS. 2a and 2b) through which the cold oil formed into a rotating oil column by rotation of the splash-lubrication pot 5 is sprayed against the disk set in order to cool it in spite of the stationary inner disk carrier.

Reference Numerals 1 clutch
2 clutch
3 clutch
4 brake
5 splash-lubrication pot
6 hole
7 clutch baffle plate
8 outer disk carrier
9 inner disk carrier
10 hollow shaft
11 cylindrical outer wall 11

What is claimed is:

1. A splash-lubrication mechanism (5,7) of a continuously variable transmission for a motor vehicle, the continuously variable transmission including at least one clutch (1) and having an inner disk carrier supporting an inner wet disk set and an outer disk carrier supporting an outer wet disk set, the clutch having an engaged state in which both the outer disk carrier and the inner disk carrier rotate with one another and the clutch having a disengaged state in which the outer disk carrier rotates while the inner disk carrier is stationary so that oil does not flow from the inner disk set and to the outer disk set;

the splash-lubrication mechanism (5, 7) comprising:
a permanently rotating part (7) of the clutch (1), and
a splash-lubrication pot (5) situated coaxially with and surrounded by the inner disk carrier and firmly connected with the permanently rotating part (7) of the clutch and having an outer wall having at least one hole formed therein for the passage of oil from the splash-lubrication pot (5) to the inner disk carrier, whereby centrifugal force resulting from rotation of the splash-lubrication pot (5) with the permanently rotating part (7) of the clutch provides a flow of the oil from the splash-lubrication pot (5) to the inner disk carrier through the at least one hole formed in the splash-lubrication pot (5).

2. The splash-lubrication mechanism according to claim 1, wherein the permanently rotating part (7) of the clutch (1) is a clutch baffle plate (7).

3. The splash-lubrication mechanism according to claim 1, wherein a multiplicity of holes are formed in the splash-lubrication pot (5) for the passage of oil therethrough.

4. The splash-lubrication mechanism according to claim 1, wherein the clutch includes a hollow shaft and the oil is fed by the hollow shaft.

5. A splash-lubrication mechanism (5, 7) of a continuously variable transmission for a motor vehicle, the continuously variable transmission including at least one clutch (1) and having an inner disk carrier supporting an inner wet disk set and an outer disk carrier supporting an outer wet disk set, the clutch having an engaged state in which both the outer disk carrier and the inner disk carrier rotate and the clutch having a disengaged state in which the outer disk carrier rotates while the inner disk carrier remains stationary; the splash-lubrication mechanism (5, 7) comprising:
  a continuously rotating part (7) of the clutch (1), and
  a splash-lubrication pot (5) firmly connected with the continuously rotating part (7) of the clutch, the splash-lubrication pot (5) situated coaxially with and accommodated by the inner disk carrier and having an outer wall having at least one hole formed therein for the passage of oil from the splash-lubrication pot (5) to the inner disk carrier, whereby centrifugal force resulting from continuous rotation of the splash-lubrication pot (5), during operation of the continuously variable transmission, provides a flow of the oil from the splash-lubrication pot (5) to the inner disk carrier through the at least one hole formed in the splash-lubrication pot (5).

6. The splash-lubrication mechanism according to claim 5, wherein the continuously rotating part (7) of the clutch (1) is a clutch baffle plate (7).

7. The splash-lubrication mechanism according to claim 5, wherein a multiplicity of holes are formed in the splash-lubrication pot (5) for the passage of oil therethrough.

8. The splash-lubrication mechanism according to claim 5, wherein the clutch includes a hollow shaft and the oil is fed by the hollow shaft.

* * * * *